US008428588B2

(12) United States Patent
Gustafsson et al.

(10) Patent No.: US 8,428,588 B2
(45) Date of Patent: Apr. 23, 2013

(54) METHOD FOR CONTEXT HANDLING

(75) Inventors: Roland Gustafsson, Myggenäs (SE); Anders Åhlén, Göteborg (SE); Lars-Bertil Olsson, Angered (SE); Hans-Olof Sundell, Kalvsund (SE); Mikael Wass, Hyssna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 160 days.

(21) Appl. No.: 12/933,767

(22) PCT Filed: Dec. 22, 2008

(86) PCT No.: PCT/EP2008/068140
§ 371 (c)(1),
(2), (4) Date: Sep. 21, 2010

(87) PCT Pub. No.: WO2009/118071
PCT Pub. Date: Oct. 1, 2009

(65) Prior Publication Data
US 2011/0021194 A1    Jan. 27, 2011

Related U.S. Application Data

(60) Provisional application No. 61/040,563, filed on Mar. 28, 2008.

(51) Int. Cl.
*H04W 4/00* (2009.01)
(52) U.S. Cl.
USPC ..... 455/435.1; 455/433; 455/436; 455/432.1; 370/331

(58) Field of Classification Search .................. None
See application file for complete search history.

(56) References Cited

PUBLICATIONS

3GPP: "3GPP TS 23.401 v8.1.0 (Mar. 2008) $3^{rd}$ Generation Partnership Project; Technical Specification Group Services and System Aspects; General. Packet Radio Service (GPRS) enhancements for Evolved Universal Terrestrial Radio Access Network (E-UTRAN) access (Release 8)"[Online] Mar. 25, 2008, pp. 43-56.

(Continued)

*Primary Examiner* — Rafael Pérez-Gutiérrez
*Assistant Examiner* — German Viana Di Prisco

(57) ABSTRACT

The invention therefore relates to a method, a first Mobility Control Node and a second Mobility Control Node for context handling when a user equipment, UE, moves from a previous Access Network, AN, to a present AN. The ANs are adapted to communicate with a Core Network, CN, and the UE is adapted to communicate wirelessly with the AN's. The method comprises the steps of: the UE detecting that it has entered a Mobility Area, MA, belonging to the present AN, said MA not being registered with the CN, the UE initiating a Mobility Area Update, MAU, procedure in response to the detection by sending a MAU Request message comprising an UE Temporary ID to a Radio Access Node, RAN, the RAN adding a Mobility Area Identity, MAI, to the Request message and forwarding the message to a first Mobility Control Node, MCN, responsible for the present AN, the first MCN deriving one second MCN from the UE Temporary ID and sending a context request message to said second MCN.

13 Claims, 2 Drawing Sheets

PUBLICATIONS

Ericsson; "CR to 24.801; Tracking area updating procedure for 3GPP access via E-UTRAN" 3GPP Draft: C1-071693. $3^{rd}$ Generation Partnership Project (3GPP), Mobile Competence Centre; 650, Route des Lucioles; F-06921 Sophia-Antipolis Cedex; France, vol. tsg_ct\WG1_mm-cc-sm_ex-CN1\TSGC1_48\Docs, No. Vienna Austria; Aug. 20, 2007, Aug. 13, 2007.

Huawei: "The TAU with MME and Serving Gateway change procedure on CN interfaces" 3GPP Draft; C4-070848, $3^{rd}$ Generation Partnership Project (3GPP), Mobile Competence Centre; 650, Route des Lucioles; F-06921 Sophia-Antipolis Cedex; France, No. Beijing; May 7, 2007, May 11, 2007, Introduction, Figure 1.

METHOD FOR CONTEXT HANDLING

This application claims the benefit of U.S. Provisional Application No. 61/040,563, filed Mar. 28, 2008, the disclosure of which is fully incorporated herein by reference.

TECHNICAL FIELD

The present invention relates to a method, a first mobility control node and a second mobility control node for context handling when a user equipment, UE, moves between Access Networks.

BACKGROUND

In the 3GPP specification TS 23.401 (v8.1.0) a procedure "E-UTRAN Tracking Area Update" (chapter 5.3.3.2) is defined (E-UTRAN—Evolved Universal Terrestrial Radio Access Network). This procedure defines how context is requested and exchanged between different 3GPP core network nodes (SGSN—Serving GPRS Support Node and MME—Mobility Management Entity).

In some operational situations the MME requests context from two other core network nodes (old SGSN and old MME) in the same procedure. To be able to perform this "context request" from one MME to the two other core network nodes (old SGSN and old MME), the terminal (UE) transfers these address information to the MME requesting the context from the two other nodes (old SGSN and old MME). For this procedure, and in the operational situation where context needs to be requested from two nodes, the context in the old SGSN contains latest updated bearer information and the old MME contains security information (authentication vectors), related to the E-UTRAN radio access.

The authentication vectors in the old MME and the authentication vectors in old SGSN are dedicated for use in E-UTRAN access respective GERAN/UTRAN (GERAN—GSM EDGE Radio Access Network and UTRAN—UMTS Terrestrial Radio Access Network). Due to security restrictions the GERAN/UTRAN authentication vectors can not be used by E-UTRAN. The signalling flow for this context request procedure (from TS 23.401, v8.1.0) is shown in FIG. 1.

The 3GPP specification also defines a procedure "E-UTRAN to GERAN Routing Area Update" (chapter 5.3.3.5). This procedure also defines how context is requested and exchanged between the core network nodes (old SGSN and old MME). The former procedure is performed when the UE moves from a GERAN/UTRAN access to E-UTRAN access, while the latter procedure is performed when the UE moves from an E-UTRAN access to a GERAN/UTRAN access. In the latter the SGSN instead (since the UE has moved to GERAN/UTRAN) request context information from two other core network (old MME and old SGSN) in the same procedure.

In some operational situations in the latter 3GPP procedure, the SGSN requests context from two other core network nodes (old SGSN and old MME) in the same procedure. To be able to perform this "context request" from one SGSN to the two other core network nodes (old SGSN and old MME), the terminal (UE) transfers these address information to the SGSN requesting the context from the two other nodes (old SGSN and old MME). For this procedure, and in the operational situation where context needs to be requested from two nodes, the context in the old SGSN contains latest updated bearer information and the old MME contains security information (authentication vectors), related to the E-UTRAN radio access.

The main problem with these solutions for context handling is that the signalling load increases, which influences the capacity.

SUMMARY

The object of the present invention is therefore to provide an improved context handling procedure that allows for a lower signalling load in the Core Network. The object is solved by means of a method, a first mobility control node and a second mobility control node according to the independent claims. The dependent claims describe further embodiments.

The invention therefore relates to a method for context handling when a user equipment, UE, moves from a previous Access Network, AN, to a present AN. The AN's are adapted to communicate with a Core Network, CN, and the UE is adapted to communicate wirelessly with the AN's. The method comprises the steps of:
  the UE detecting that it has entered a Mobility Area, MA, belonging to the present AN, said MA not being registered with the CN,
  the UE initiating a Mobility Area Update, MAU, procedure in response to the detection by sending a MAU Request message comprising an UE Temporary ID to a Radio Access Node, RAN,
  the RAN adding a Mobility Area Identity, MAI, to the Request message and forwarding the message to a first Mobility Control Node, MCN, responsible for the present AN,
  the first MCN deriving one second MCN from the UE Temporary ID and sending a context request message to said second MCN.

The present invention also relates to a first Mobility Control Node, MCN, which is adapted for context handling when a user equipment, UE, moves from a previous Access Network, AN, to a present AN. The AN's are adapted to communicate with a Core Network, CN, and the UE is adapted to communicate wirelessly with the AN's. The UE is furthermore adapted to detect that it has entered a Mobility Area, MA, belonging to the present AN, said MA not being registered with the CN. The UE is further adapted to initiate a Mobility Area Update, MAU, procedure in response to the detection, by sending a MAU Request message comprising an UE Temporary ID to a Radio Access Node, RAN. The RAN is adapted to add a Mobility Area Update, MAI, to the Request message and forward the message to a first Mobility Control Node, MCN, responsible for the present AN. The first MCN is particularly characterized in that it is adapted to derive one second MCN from the UE Temporary ID and send a context request message to said second MCN.

The present invention finally relates to a second Mobility Control Node, MCN, which is adapted for context handling when a user equipment, UE, moves from a previous Access Network, AN, to a present AN. The AN's are adapted to communicate with a Core Network, CN, and the UE is adapted to communicate wirelessly with the AN's. The UE is furthermore adapted to detect that it has entered a Mobility Area, MA, belonging to the present AN, said MA not being registered with the CN. The UE is further adapted to initiate a Mobility Area Update, MAU, procedure in response to the detection, by sending a MAU Request message comprising an UE Temporary ID to a Radio Access Node, RAN. The RAN is adapted to add a Mobility Area Update, MAI, to the Request message and forward the message to a first Mobility Control Node, MCN, responsible for the present AN. The second MCN is particularly characterized in that it is adapted to send a context response message to a first MCN in response to a context request message sent by the first MCN. The response message comprises context information from all second MCN former responsible for a previous AN.

The present invention provides a number of advantages over the known solution. Firstly, only one signalling sequence has to be performed in order to retrieve relevant context from the node latest accessed by the terminal. This simplifies the procedure and shortens the total procedure time. Secondly, only one node ID/address needs to be transferred from the terminal (UE) to the MME requesting the context information. Finally, security pitfalls are avoided, by only transferring (not using) security information related to an alternative access.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

The embodiments of the invention with further developments described in the following are to be regarded only as examples and are in no way to limit the scope of the protection provided by the patent claims.

The concept of the present invention is to have only one context stored in one node at a time (SGSN or MME). This context contains all relevant information for both GERAN/UTRAN and E-UTRAN accesses. E. g. authentication vectors for all accesses are stored in the same context. The solution removes the need to perform double context requests in the "E-UTRAN Tracking Area Update" procedure.

Figure 2:
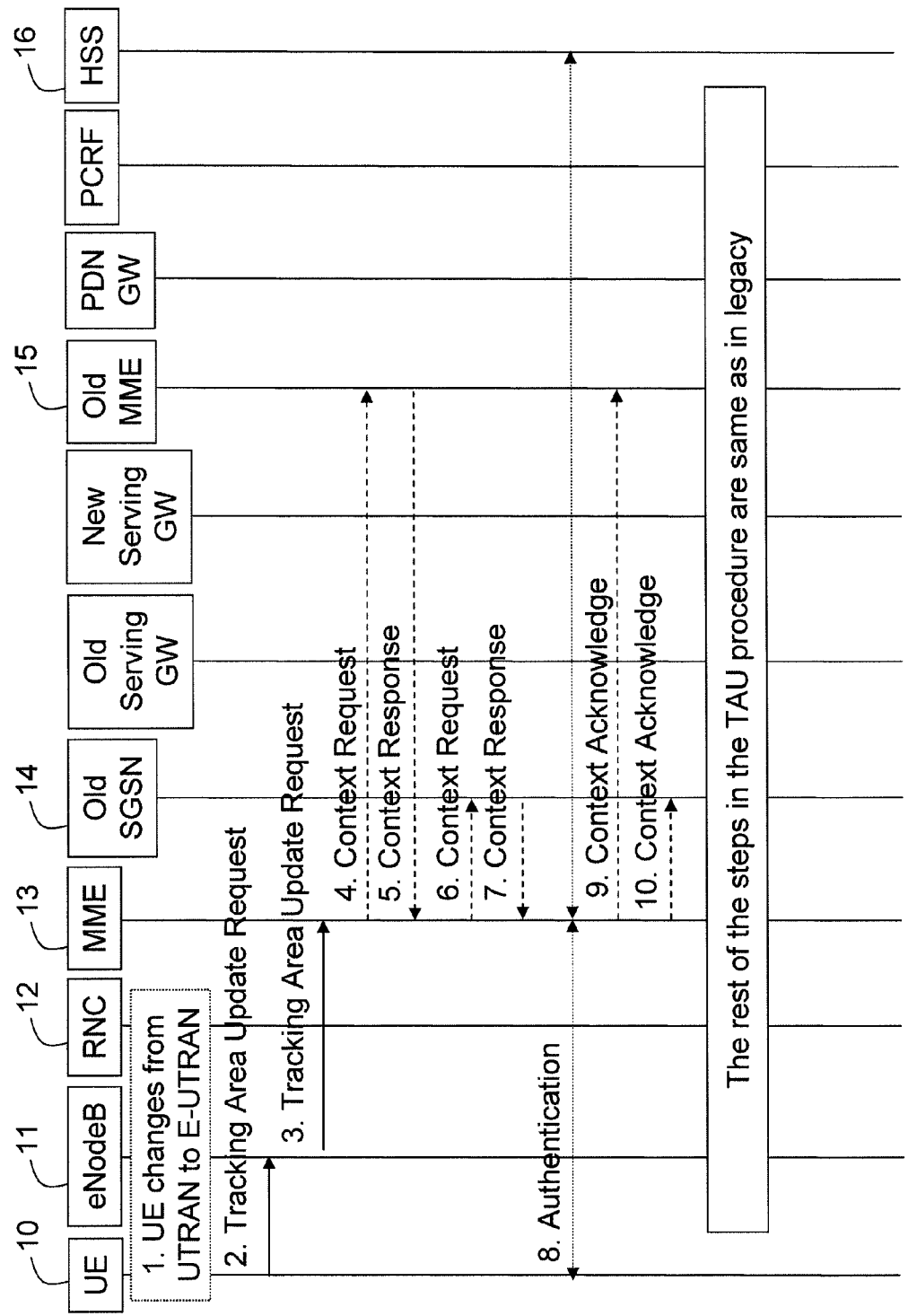
FIG. 2 illustrates the signalling flow procedure according to the present invention.

This concept, see FIG. 2, is achieved by means of a method, a first mobility control node and a second mobility control node, for context handling when a user equipment, UE 10, moves from a previous Access Network, AN, to a present AN. The AN's are adapted to communicate with a Core Network, CN, and the UE is adapted to communicate wirelessly with the AN's. In the following method steps:

The present AN will be exemplified by an Evolved Universal Terrestrial Radio Access Network, E-UTRAN.

The previous AN will be exemplified by an E-UTRAN, a GSM EDGE Radio Access Network, GERAN or an UMTS Terrestrial Radio Access Network, UTRAN.

The Core Network will be named "network".

A Mobility Area, MA, will be exemplified by a Tracking Area, TA.

A MA Update, MAU, will be exemplified by a TA Update, TAU.

A MAU Request will be exemplified by a TAU Request.

A Mobility Area Identity, MAI, will be exemplified by E-UTRAN Area Identity and Tracking Area Identity, TAI.

A first Mobility Control Node, MCN, will be exemplified by a new MME 13 and a second mobility control node will be exemplified by the old MME 15 or the old SGSN 14.

A Radio Access Node, RAN, will be exemplified by eNodeB 11.

In the following, the method will be described with reference to FIG. 2. Some nodes in FIG. 2 have no role in the present invention, and will therefore not be referred to in the following. It should be realized by a person skilled in the art, that the new MME 13 and the old MME/SGSN 14, 15, since they perform certain method steps, are adapted to perform these steps. The following method steps are performed, see FIG. 2:

1. The UE 10 detects that it has entered a TA belonging to the E-UTRAN, said TA not being registered with the network. This means that the UE 10 for instance selects an E-UTRAN cell of a TA which is not in the UE's list of TAI's that the UE registered with the network.

2. The UE 10 initiates a TAU procedure by sending a Tracking Area Update Request (UE Temporary ID, etc) message to the eNodeB 11. The UE Temporary ID contains old (previous) P-TMSI (Packet Temporary Mobile Subscriber Identity), old (previous) RAI (Radio Access Identity) and P-TMSI Signature if latest access (previous AN) was GERAN/UTRAN and GUTI (Globally Unique Temporary Identity) if latest access was E-UTRAN.

3. The eNodeB 11 shall add the E-UTRAN Area Identity before forwarding the message to the new MME 13. The eNodeB forwards the TAU Request message together with the E-UTRAN Area Identity and with the Selected Network to the new MME 13 (responsible for the E-UTRAN).

In the alternative steps 4 and 6 below, the new MME 13 derives one old MME 15 or one old SGSN 14 from the UE Temporary ID and sends a context request message to said old MME/SGSN. The new MME derives one and only one old MME/SGSN from the UE temporary ID instead of two, which is an important feature in the present invention.

In the following steps 5 and 7, the old MME/SGSN sends a context response message to the new MME in response to the context request message. The response message comprises context information from all old MME/SGSN, former responsible for a E-UTRAN/GERAN-UTRAN:

4. If the UE 10 in the UE Temporary ID provided GUTI, the new MME 13 sends a Context Request (old S-TMSI, MME Address, etc.) message to the old MME 15 to retrieve the context. The new MME derives the old MME from the GUTI.

5. The old MME 15 responds with one Context Response (Context) message. The context consists of latest bearer contexts, authentication vectors (security context) for E-UTRAN and if available authentication vectors for GERAN and UTRAN. This message is only sent if step 4 is performed.

6. If the UE 10 in the UE Temporary ID provided an old P-TMSI, old RAI and P-TMSI Signature the new MME 13 sends an SGSN Context Request (old RAI, old P-TMSI, P-TMSI Signature, MME Address) message to the old SGSN 14 to retrieve the user information. The new MME 13 derives the old SGSN 14 from the old RAI and old P-TMSI.

7. The old SGSN 14 responds with an SGSN Context Response (Context) message. The context consists of latest bearer contexts, authentication vectors (security context) for GERAN and UTRAN and if available authentication vectors for E-UTRAN. This message is only sent if step 7 is performed.

8. If authentication is performed new E-UTRAN authentication vectors are downloaded from the HSS (Home Subscriber Server) 16 to new MME 13.

If this e.g. was the first time the UE 10 accessed in E-UTRAN and previous access was GERAN/UTRAN, the new MME 13 contains both the E-UTRAN Authentication Vectors (downloaded from HSS) and the GERAN/UTRAN Authentication Vectors downloaded in step 5 above.

9. The new MME 13 sends a Context Acknowledge message to the old MME 15. This message is only sent if step 4 and 5 are performed.

10. The new MME 13 sends an SGSN Context Acknowledge message to the old SGSN 14. This message is only sent if step 6 and 7 are performed.

Figure 1:
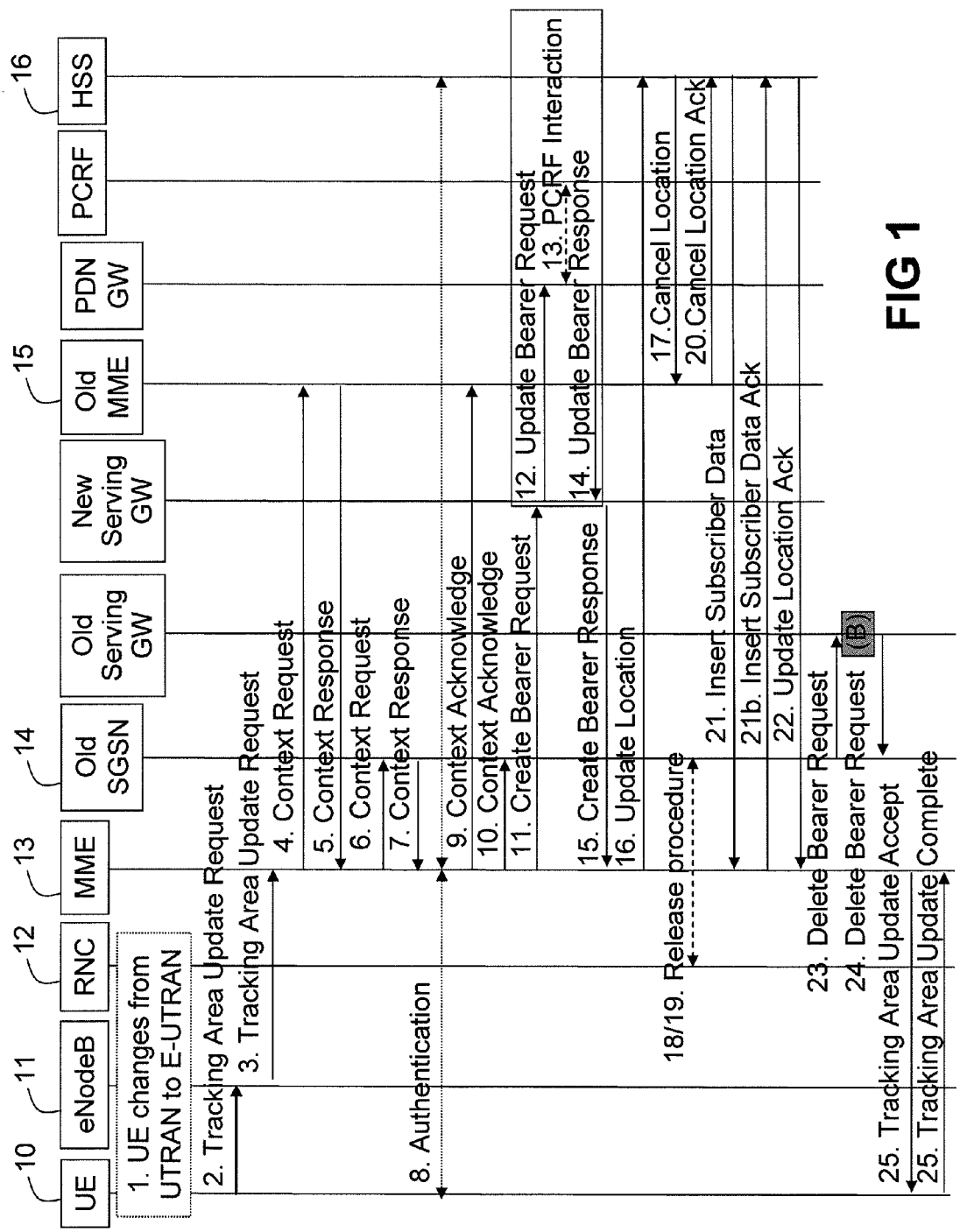
FIG. 1 illustrates the known signalling flow procedure according to 3GPP TS 23.401 (v8.1.0).

11-26 The rest of the steps in this procedure, see FIG. 1, are left out as these steps has no influence on the invention.

The important steps (see FIG. 2) of the invention are:

Steps 2 and 3. In these steps the UE 10 sends the UE temporary identity of the access that the UE latest performed an update in, which can be P-TMSI (GERAN/UTRAN) or GUTI (E-UTRAN).

Steps 4 and 5. If latest access was in E-UTRAN, the new MME 13 request context information from the old MME 15 where it previously has been registered in. This context contains at least E-UTRAN Authentication Vectors but can also contain GERAN/UTRAN Authentication Vectors if the UE 10 in a previous occasion was registered in GERAN/UTRAN.

Steps 6 and 7. If latest access was in GERAN/UTRAN, the new MME 13 request context information from the old SGSN 14 where it previously has been registered in. This context contains at least GERAN/UTRAN Authentication Vectors but can also contain E-UTRAN Authentication Vectors if the UE 10 in a previous occasion had been registered in E-UTRAN.

A person skilled in the art would also realize that the inventive concept, illustrated by the method steps above, embraces also a situation where the UE 10 moves to a GERAN/UTRAN (from an E-UTRAN or an GERAN/UTRAN). The concept still is to have only one context stored in one node at a time (SGSN or MME). This context contains all relevant information for both GERAN/UTRAN and E-UTRAN accesses. The solution removes the need to perform double context requests.

This appears clearly when replacing the features in the method steps above, which steps intends to illustrate the inventive concept of the patent claims. The replacements of the features above are:

The present AN will instead be exemplified by an GERAN/UTRAN.

The previous AN will is now also exemplified by an E-UTRAN, a GSM EDGE Radio Access Network, GERAN or an UMTS Terrestrial Radio Access Network, UTRAN.

The Core Network will still be named "network".

A Mobility Area, MA, will instead be exemplified by a Routing, RA.

A MA Update, MAU, will instead be exemplified by a RA Update, RAU.

A MAU Request will instead be exemplified by a RAU Request.

A Mobility Area Identity, MAI, will instead be exemplified by Routing Area Identity and Cell Global Identity.

A first Mobility Control Node, MCN, will be exemplified by a new SGSN while a second mobility control node will still be exemplified by an old MME 15 or an old SGSN 14.

A Radio Access Node, RAN, will be exemplified by RNC 12.

The inventive concept is not influenced by these replacements. The only difference is that the present AN is GERAN/UTRAN. This results in that the first MCN is SGSN and the TA is replaced by the RA. This will only influence the method steps above, and not the inventive concept.

The person skilled in the art would furthermore realize that the present invention implies a procedure where the context is built over time. The context then has to be transferred between the SGSN 14 and the MME 15, between MME's or between SGSN's. It comprises both static and dynamic information, which is information that can change when the context arrives at the new node. Information can also be specific for the radio access that the UE 10 is connected to. The first time the UE is attached to for instance to an MME 15, a context is created which is specific for this UE. The information is for instance safety keys, the Quality of Service parameters for the UE, address information to nodes to which data and control signalling should be performed etc. When the UE moves to an SGSN 14, this context is transferred to the SGSN 14 from the MME 15 (via Context Request and Context Response). The SGSN needs other safety keys and QoS parameters. This means that the context from the MME is modified and new information is added thereto. This further results in that a context is created, which is useful both in an MME and an SGSN, and this context is continuously transferred between the nodes.

The invention is not to be regarded as being limited to the embodiments described above, a number of additional variants and modifications being possible within the scope of the subsequent patent claims.

The invention claimed is:

1. A method for context handling when a user equipment, UE, moves from a previous Access Network, AN, to a present AN, the ANs being adapted to communicate with a Core Network, CN, and the UE being adapted to communicate wirelessly with the AN's, the method comprising the steps of:

the UE detecting that it has entered a Mobility Area, MA, belonging to the present AN, said MA not being registered with the CN, the UE initiating a Mobility Area Update, MAU, procedure in response to the detection by sending a MAU Request message comprising an UE Temporary ID to a Radio Access Node, RAN, the RAN adding a Mobility Area Identity, MAI, to the Request message and forwarding the message to a first Mobility Control Node, MCN, responsible for the present AN, the first MCN deriving one single second MCN from the UE Temporary ID and sending a context request message to said second MCN, and the second MCN sending a context response message to the first MCN in response to the context request message, the response message comprising context information from all other MCNs formerly responsible for a previous AN.

2. The method according to claim 1 wherein the second MCN is responsible for the previous AN.

3. The method according to claim 1, wherein the context information comprises bearer contexts and security contexts for all previous AN's.

4. The method according to claim 1 comprises the step of: the first MCN sending a context acknowledge message to said second MCN.

5. The method according to claim 1, wherein the first MCN consists in a Serving GPRS Support Node, SGSN, or a Mobility Management Entity, MME.

6. The method according to claim 1, wherein the second MCN consists in a Serving GPRS Support Node, SGSN, or a Mobility Management Entity, MME.

7. The method according to claim 1, wherein the present AN consist in a Evolved Universal Terrestrial Radio Access Network, E-UTRAN, a GSM EDGE Radio Access Network, GERAN or an UMTS Terrestrial Radio Access Network, UTRAN.

8. The method according to claim 1, wherein the previous AN consists in a Evolved Universal Terrestrial Radio Access Network, E-UTRAN, a GSM EDGE Radio Access Network, GERAN or an UMTS Terrestrial Radio Access Network, UTRAN.

9. The method according to claim 8, wherein UE Temporary ID contains previous Packet Temporary Mobile Subscriber Identity, P-TMSI, previous Radio Access Identity and P-TMSI Signature if previous AN is GERAN or UTRAN and Globally Unique Temporary Identity, GUTI, if previous AN is E-UTRAN.

10. A second Mobility Control Node, MCN, being adapted for context handling when a user equipment, UE, moves from a previous Access Network, AN, to a present AN, the ANs being adapted to communicate with a Core Network, CN, and the UE being adapted to communicate wirelessly with the ANs, wherein:

the UE is adapted to detect that it has entered a Mobility Area, MA, belonging to the present AN, said MA not being registered with the CN, the UE is further adapted to initiate a Mobility Area Update, MAU, procedure in response to the detection, by sending a MAU Request message comprising an UE Temporary ID to a Radio Access Node, RAN, the RAN is adapted to add a Mobility Area Update, MAI, to the Request message and forward the message to a first Mobility Control Node, MCN, responsible for the present AN, characterized in that the second MCN is adapted to send a context response message to a first MCN in response to a context request message sent by the first MCN, the response message comprising context information from all other MCNs formerly responsible for a previous AN.

11. The second MCN according to claim 10, wherein the first MCN being adapted to derive one single second MCN from the UE Temporary ID and send the context request message to said second MCN.

12. A second MCN according to claim 10 wherein the second MCN is responsible for the previous AN.

13. A system being adapted for context handling when a user equipment, UE, moves from a previous Access Network, AN, to a present AN, the AN's being adapted to communicate with a Core Network, CN, and the UE being adapted to communicate wirelessly with the AN's, the system comprising a second MCN and a first MCN according to claim 10.

* * * * *

UNITED STATES PATENT AND TRADEMARK OFFICE
CERTIFICATE OF CORRECTION

| | |
|---|---|
| PATENT NO. | : 8,428,588 B2 |
| APPLICATION NO. | : 12/933767 |
| DATED | : April 23, 2013 |
| INVENTOR(S) | : Gustafsson et al. |

Page 1 of 1

It is certified that error appears in the above-identified patent and that said Letters Patent is hereby corrected as shown below:

In the Drawings:

In Fig. 1, Sheet 1 of 2, delete "FIG 1" and insert -- FIG. 1 --, therefor.

In Fig. 2, Sheet 2 of 2, delete "FIG 2" and insert -- FIG. 2 --, therefor.

In the Specifications:

In Column 3, Line 34, delete "E. g." and insert -- E.g. --, therefor.

In Column 5, Lines 28-29, delete "an GERAN/UTRAN)." and insert -- a GERAN/UTRAN). --, therefor.

In Column 5, Lines 38-39, delete "an GERAN/UTRAN." and insert -- a GERAN/UTRAN. --, therefor.

In the Claims:

In Column 8, Line 14, in Claim 12, delete "A second" and insert -- The second --, therefor.

Signed and Sealed this
Twentieth Day of August, 2013

Teresa Stanek Rea
*Acting Director of the United States Patent and Trademark Office*